(12) United States Patent
Bai et al.

(10) Patent No.: US 11,631,325 B2
(45) Date of Patent: Apr. 18, 2023

(54) METHODS AND SYSTEMS FOR TRAFFIC LIGHT STATE MONITORING AND TRAFFIC LIGHT TO LANE ASSIGNMENT

(71) Applicant: GM GLOBAL TECHNOLOGY OPERATIONS LLC, Detroit, MI (US)

(72) Inventors: Fan Bai, Ann Arbor, MI (US); Bo Yu, Troy, MI (US); David A. Craig, Macomb, MI (US); Ashok Yendluri, Southfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 753 days.

(21) Appl. No.: 16/550,808

(22) Filed: Aug. 26, 2019

(65) Prior Publication Data

US 2021/0065544 A1 Mar. 4, 2021

(51) Int. Cl.
*G05D 1/00* (2006.01)
*G08G 1/095* (2006.01)
*G06N 20/00* (2019.01)
*H04L 67/10* (2022.01)

(52) U.S. Cl.
CPC ............ *G08G 1/095* (2013.01); *G05D 1/0088* (2013.01); *G06N 20/00* (2019.01); *G05D 2201/0213* (2013.01); *H04L 67/10* (2013.01)

(58) Field of Classification Search
CPC .... G08G 1/095; G08G 1/0129; G08G 1/0145; G08G 1/04; G08G 1/0112; G08G 1/0104; G08G 1/0125; G08G 1/052; G08G 1/07; G08G 1/09; G05D 1/0088; G05D 2201/0213; G05D 1/00; G06N 20/00; G06N 7/005; H04L 67/10; H04L 67/125

USPC .......................................................... 701/24
See application file for complete search history.

(56) References Cited

U.S. PATENT DOCUMENTS

| | | | | |
|---|---|---|---|---|
| 2011/0095908 A1* | 4/2011 | Nadeem | ................... | G08G 1/20 340/905 |
| 2014/0226383 A1* | 8/2014 | Brust | ...................... | H02M 7/06 363/126 |
| 2014/0226838 A1* | 8/2014 | Wingate | .............. | G10L 21/0272 381/111 |
| 2016/0379486 A1* | 12/2016 | Taylor | ...................... | G08G 1/08 340/905 |

(Continued)

FOREIGN PATENT DOCUMENTS

CN 107784852 A 3/2018

*Primary Examiner* — Shardul D Patel
(74) *Attorney, Agent, or Firm* — Lorenz & Kopf LLP

(57) ABSTRACT

Systems and methods are provided for interpreting traffic information. A method includes: receiving, by a processor, visual data from vehicles, wherein the visual data is associated with an intersection of a roadway having one or more lanes; receiving, by the processor, vehicle data from the vehicles, wherein the vehicle data is associated with the intersection of the roadway; determining, by the processor, a first state of a traffic light associated with the intersection based on the visual data; determining, by the processor, a second state of the traffic light associated with the intersection based on the vehicle data; correlating, by the processor, the first state and the second state based on a time synchronization; assigning, by the processor, the traffic light to a lane of the roadway based on the correlating; and communicating, by the processor, the traffic light to lane assignment for use in controlling a vehicle.

20 Claims, 6 Drawing Sheets

(56) References Cited

U.S. PATENT DOCUMENTS

| | | | |
|---|---|---|---|
| 2018/0151064 A1* | 5/2018 | Xu | G08G 1/0133 |
| 2018/0162409 A1* | 6/2018 | Altmannshofer | G06V 20/584 |
| 2018/0181884 A1* | 6/2018 | Rolle | G08G 1/0141 |
| 2018/0374341 A1* | 12/2018 | Branson | B60W 60/0027 |
| 2018/0374359 A1* | 12/2018 | Li | G06N 3/04 |
| 2019/0122548 A1* | 4/2019 | Sakuma | G08G 1/08 |
| 2021/0046933 A1* | 2/2021 | Iihoshi | G08G 1/16 |
| 2021/0179095 A1* | 6/2021 | Penilla | B60W 30/09 |

* cited by examiner

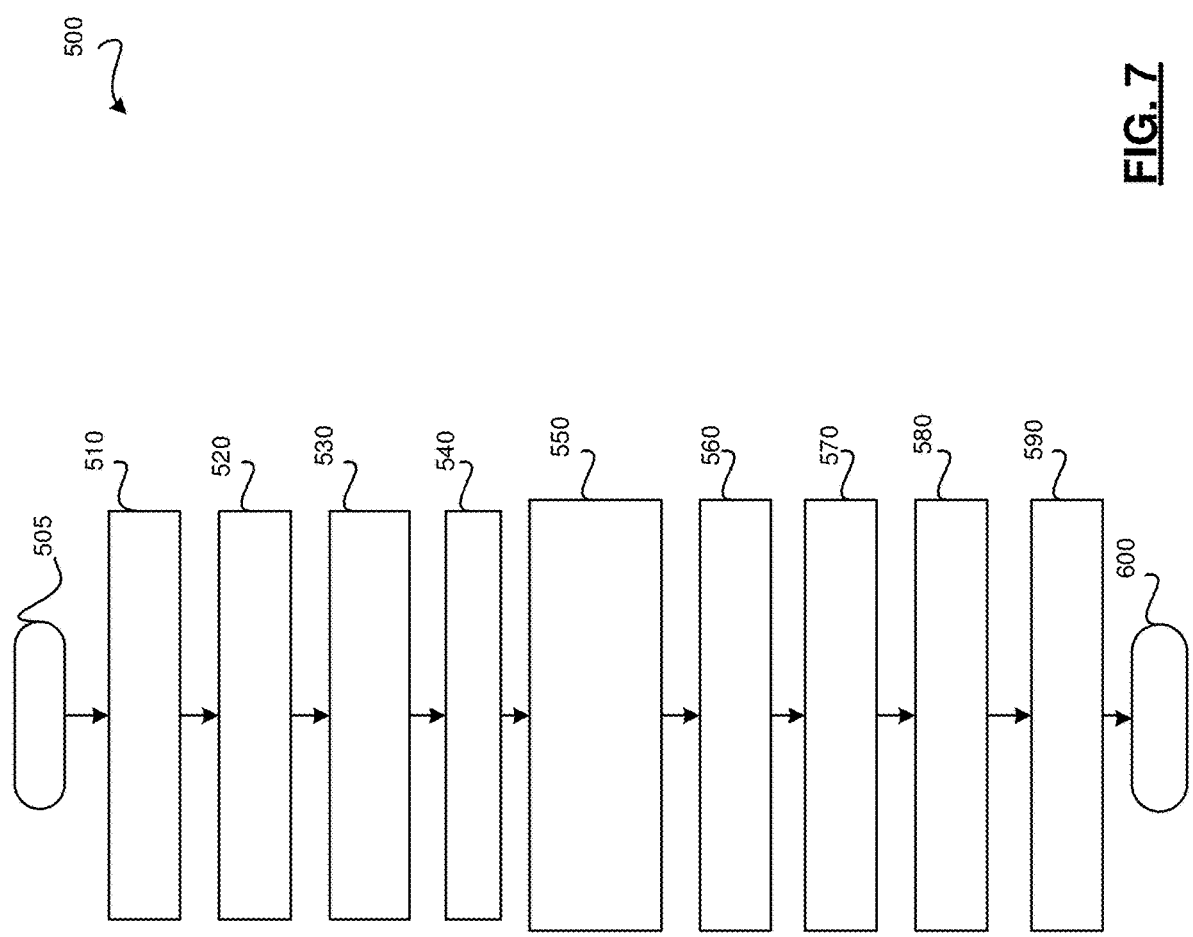

METHODS AND SYSTEMS FOR TRAFFIC LIGHT STATE MONITORING AND TRAFFIC LIGHT TO LANE ASSIGNMENT

INTRODUCTION

The present disclosure generally relates to vehicles, and more particularly relates to the detection and interpretation of traffic signals that regulate the traffic flow of vehicles.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, autonomous vehicles detect traffic devices using one or more of the sensing devices. The autonomous vehicles also determine a traffic signal that is emitted from the traffic device. In order to plan the route for the vehicle, the autonomous vehicle must know which lane the detected traffic device relates to and must know the current traffic signal or state (e.g., red light, green light, yellow light, green arrow, etc.) of the traffic device. In some instances the determination of the related lane and/or the current traffic signal is inaccurate.

Accordingly, it is desirable to provide improved systems and methods for detecting and interpreting traffic signals of a traffic device. It is further desirable to provide improved systems and method for determining a lane associated with a determined traffic signal. Furthermore, other desirable features and characteristics of the present disclosure will become apparent from the subsequent detailed description and the appended claims, taken in conjunction with the accompanying drawings and the foregoing technical field and background.

SUMMARY

Systems and methods are provided for interpreting traffic information. In one embodiment, a method includes: receiving, by a processor, visual data from a plurality of vehicles, wherein the visual data is associated with an intersection of a roadway having one or more lanes; receiving, by the processor, vehicle data from the plurality of vehicles, wherein the vehicle data is associated with the intersection of the roadway; determining, by the processor, a first state of a traffic light associated with the intersection based on the visual data; determining, by the processor, a second state of the traffic light associated with the intersection based on the vehicle data; correlating, by the processor, the first state and the second state based on a time synchronization; assigning, by the processor, the traffic light to a lane of the roadway based on the correlating; and communicating, by the processor, the traffic light to lane assignment for use in controlling a vehicle of the multiple vehicles.

In various embodiments, the method includes: determining, by the processor, a change in state of the traffic light based on the correlated first state and second state; determining, by the processor, a vehicle velocity associated with the lane based on the vehicle data; and wherein the correlating is based on the change in state of the traffic light and the vehicle velocity.

In various embodiments, the determining the first state is based on a joint Hidden Markov Model. In various embodiments, the joint HMM includes an iterative expectation maximization method. In various embodiments, the determining the second state is based on a trained machine learning model.

In various embodiments, the method includes: associating, by the processor, a behavioral state with each of the vehicle data from the multiple vehicles; aggregating, by the processor, the vehicle data from the multiple vehicles based on the associated behavioral state and a time associated with the vehicle data; and processing the aggregated vehicle data with the trained machine learning model.

In various embodiments, the behavioral state is at least one of an accelerating state, a stopping state, a stopped state, and a cruising state.

In various embodiments, the aggregating is based on an aggregated state function and an inverse of the aggregated state function.

In various embodiments, the first state is at least one of a green state, an amber state, and a red state, and wherein the second state is at least one of the green state, the amber state, and the red state.

In another embodiment, a system for interpreting traffic information is provided. The system includes: a first data storage device that stores visual data from a plurality of vehicles, wherein the visual data is associated with an intersection of a roadway having one or more lanes; a second data storage device that stores vehicle data from the plurality of vehicles, wherein the vehicle data is associated with the intersection of the roadway; and a processor configured to: receive the visual data and the vehicle data, determine a first state of a traffic light associated with the intersection based on the visual data, determine a second state of the traffic light associated with the intersection based on the vehicle data, correlate the first state and the second state based on a time synchronization, assign the traffic light to a lane of the roadway based on the correlating.

In various embodiments, the processor is further configured to: determine a change in state of the traffic light based on the correlated first state and second state; determine a vehicle velocity associated with the lane based on the vehicle data; wherein correlate based on the change in state of the traffic light and the vehicle velocity.

In various embodiments, the processor is configured to determine the first state based on a joint Hidden Markov Model. In various embodiments, the joint HMM includes an iterative expectation maximization method. In various embodiments, the processor is configured to determine the second state based on a trained machine learning model.

In various embodiments, the processor is further configured to: associate a behavioral state with each of the vehicle data from the multiple vehicles; aggregate the vehicle data from the multiple vehicles based on the associated behavioral state and a time associated with the vehicle data; and process the aggregated vehicle data with the trained machine learning model.

In various embodiments, the behavioral state is at least one of an accelerating state, a stopping state, a stopped state, and a cruising state.

In various embodiments, processor aggregates based on an aggregated state function and an inverse of the aggregated state function.

In various embodiments, the first state is at least one of a green state, an amber state, and a red state, and wherein the second state is at least one of the green state, the amber state, and the red state.

In various embodiments, the system includes a cloud server remote from the multiple vehicles that includes the first data storage device, the second data storage device, and the processor.

In various embodiments, the cloud sever is configured to communicate the traffic light to lane assignment to the multiple vehicles for use in controlling the multiple vehicles.

BRIEF DESCRIPTION OF THE DRAWINGS

The exemplary embodiments will hereinafter be described in conjunction with the following drawing figures, wherein like numerals denote like elements, and wherein:

FIG. 7 is a flowchart illustrating an interpretation method that may be performed by the interpretation system, in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
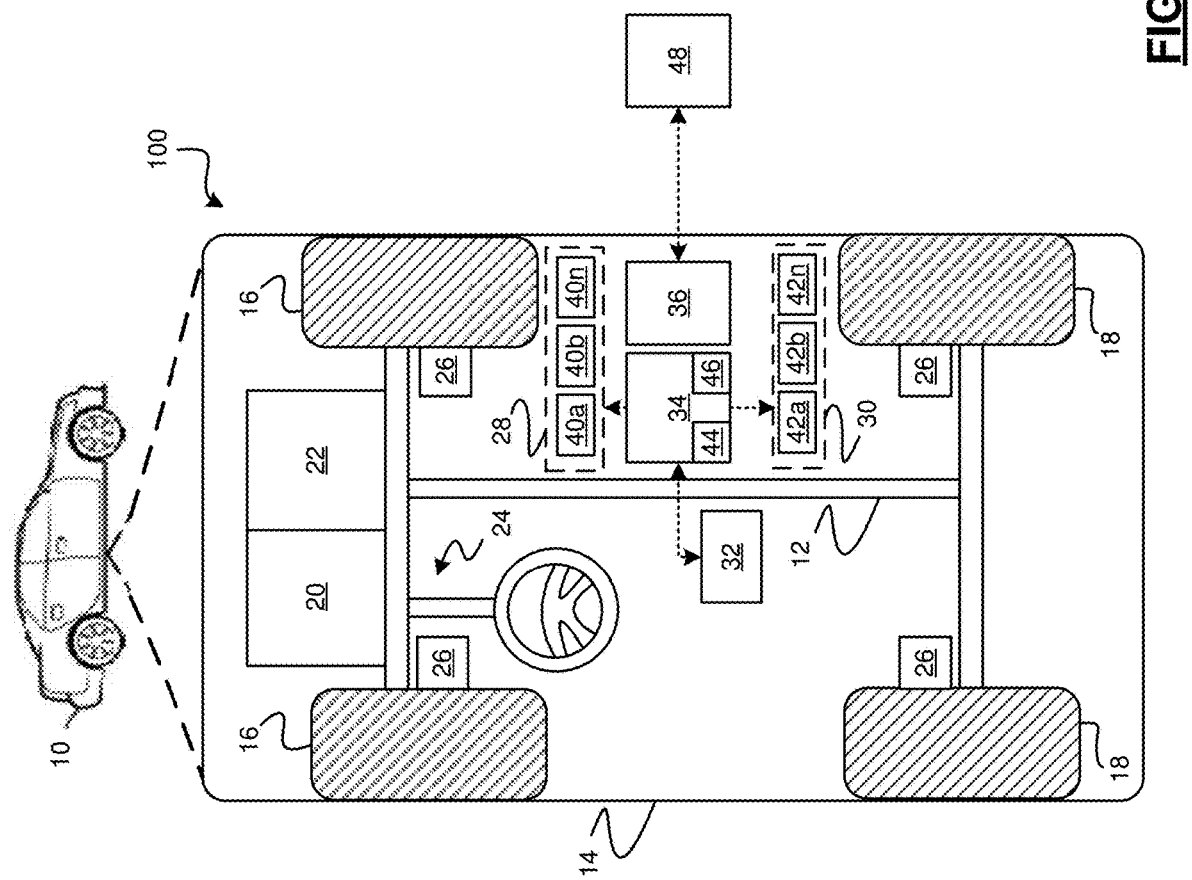
FIG. 1 is a functional block diagram illustrating an autonomous vehicle having an interpretation system, in accordance with various embodiments.

With reference to FIG. 1, an interpretation system shown generally at 100 is associated with a vehicle 10 in accordance with various embodiments. In general, the interpretation system 100 processes data provided by one or more sensing devices disposed about the vehicle 10 (as will be discussed in more detail below) to detect traffic devices in the environment of the vehicle 10. The interpretation system 100 then interprets a current traffic signal (e.g., red light, green light, yellow light, green arrow, red flashing, yellow flashing, etc.) of the detected traffic device In various embodiments, the interpretation system 100 makes use of crowd sourced information including two independent observation channels (camera vs. vehicle kinematic CAN Bus) to monitor a traffic light state. In various embodiments, the interpretation system 100 makes use of crowd sourced information using a time correlation function between the two independent observations channels to find traffic-light-to-lane assignment. In various embodiments, the autonomous vehicle 10 uses the traffic light state and the traffic-light-to-lane assignment to make decisions about navigating the vehicle 10 through the environment.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the interpretation system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, or simply robots, etc., that are regulated by traffic devices can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments, the autonomous vehicle 10 can be any level of automation or have no automation at all (e.g., when the system 100 simply presents the probability distribution to a user for decision making).

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. In various embodiments, the sensing devices 40a-40n include one or more image sensors that generate image sensor data that is used by the interpretation system 100.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc.

Figure 2:
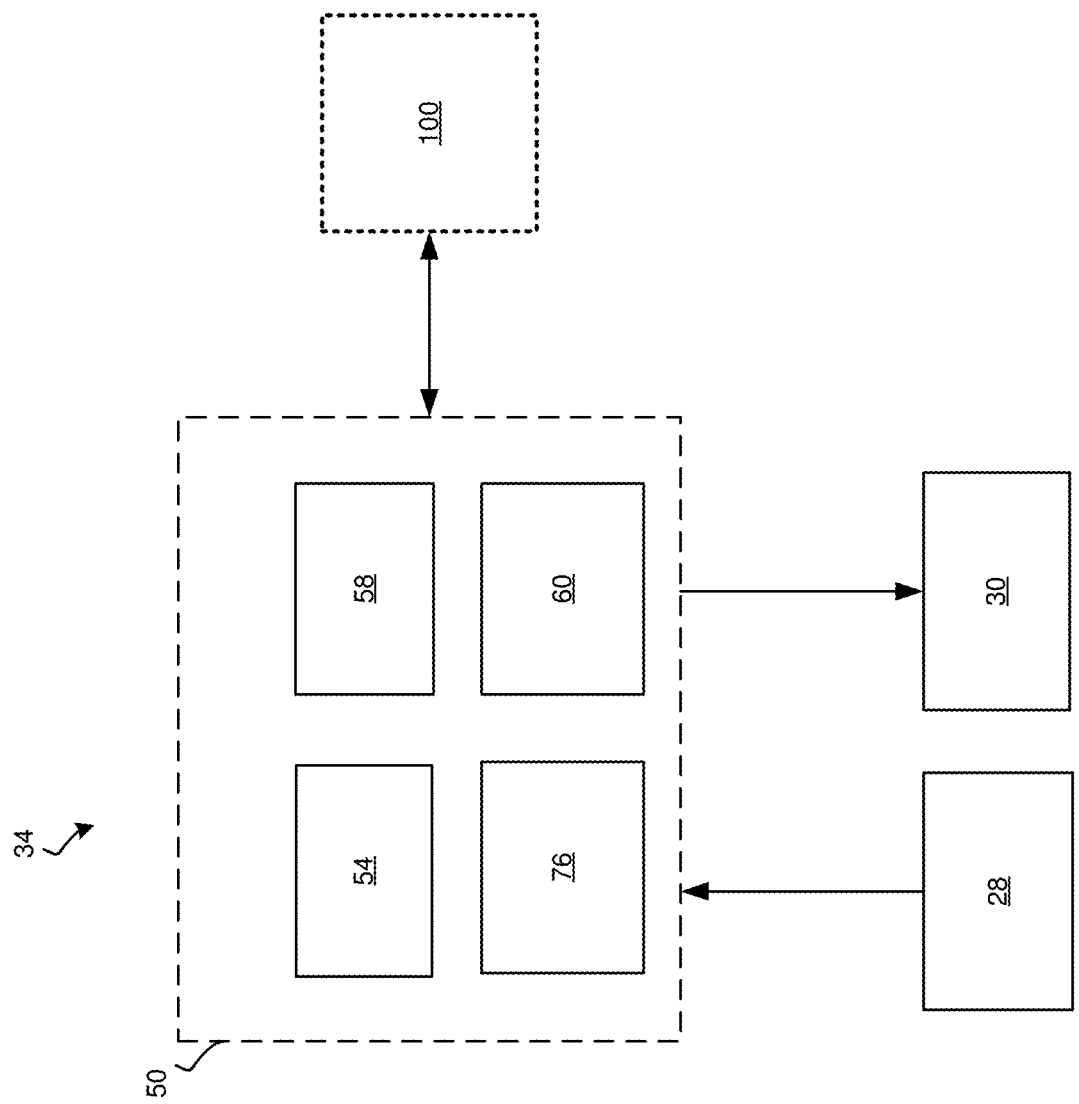
FIG. 2 is a dataflow diagram illustrating an autonomous driving system that includes the interpretation system, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps are built from the sensor data of the vehicle 10. In various embodiments, the maps are received from a remote system and/or other vehicles. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the interpretation system 100 and, when executed by the processor 44, integrates real time information from the sensing devices 28 and information from the data storage device and outputs a traffic signal state and/or a traffic-light-to-lane assignment based thereon. The instructions of the controller 34 further make use of these values in making decisions for and planning upcoming vehicle maneuvers used to navigate the vehicle 10 through the environment.

As can be appreciated, the controller 34 may be implemented as multiple controllers including at least one residing on the vehicle and at least one residing remote from the vehicle. In such embodiments, functions of the interpretation system 100 may implemented on any of the controllers 34, including partially on a first controller of the vehicle and partially on a second controller residing for example on a server system.

As can be appreciated, the subject matter disclosed herein provides certain enhanced features and functionality to what may be considered as a standard or baseline non-autonomous vehicle or an autonomous vehicle 10, and/or an autonomous vehicle based remote transportation system (not shown) that coordinates the autonomous vehicle 10. To this end, a non-autonomous vehicle, an autonomous vehicle, and an autonomous vehicle based remote transportation system can be modified, enhanced, or otherwise supplemented to provide the additional features described in more detail below. For exemplary purposes the examples below will be discussed in the context of an autonomous vehicle.

In accordance with various embodiments, the controller 34 implements an autonomous driving system (ADS) 50 as shown in FIG. 2. That is, suitable software and/or hardware components of the controller 34 (e.g., the processor 44 and the computer-readable storage device 46) are utilized to provide an autonomous driving system 50 that is used in conjunction with vehicle 10.

In various embodiments, the instructions of the autonomous driving system 50 may be organized by function, module, or system. For example, as shown in FIG. 2, the autonomous driving system 50 can include a computer vision system 54, a positioning system 56, a guidance system 58, and a vehicle control system 60. As can be appreciated, in various embodiments, the instructions may be organized into any number of systems (e.g., combined, further partitioned, etc.) as the disclosure is not limited to the present examples.

In various embodiments, the computer vision system 54 synthesizes and processes sensor data and predicts the presence, location, classification, and/or path of objects and features of the environment of the vehicle 10. In various embodiments, the computer vision system 54 can incorporate information from multiple sensors, including but not limited to cameras, lidars, radars, and/or any number of other types of sensors.

The positioning system 56 processes sensor data along with other data to determine a position (e.g., a local position relative to a map, an exact position relative to lane of a road, vehicle heading, velocity, etc.) of the vehicle 10 relative to the environment. The guidance system 58 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, the interpretation system 100 of FIG. 1 may be included within the ADS 50, for example, as part of the guidance system 58 or may communicate with the ADS 50 (e.g., through a communication system) as shown. For example, the interpretation system 100 receives data from the computer vision system 54 and the positioning system 56 and provides traffic light information and/or lane information used in decision making to ultimately determine the path of the vehicle 10.

Figure 3:
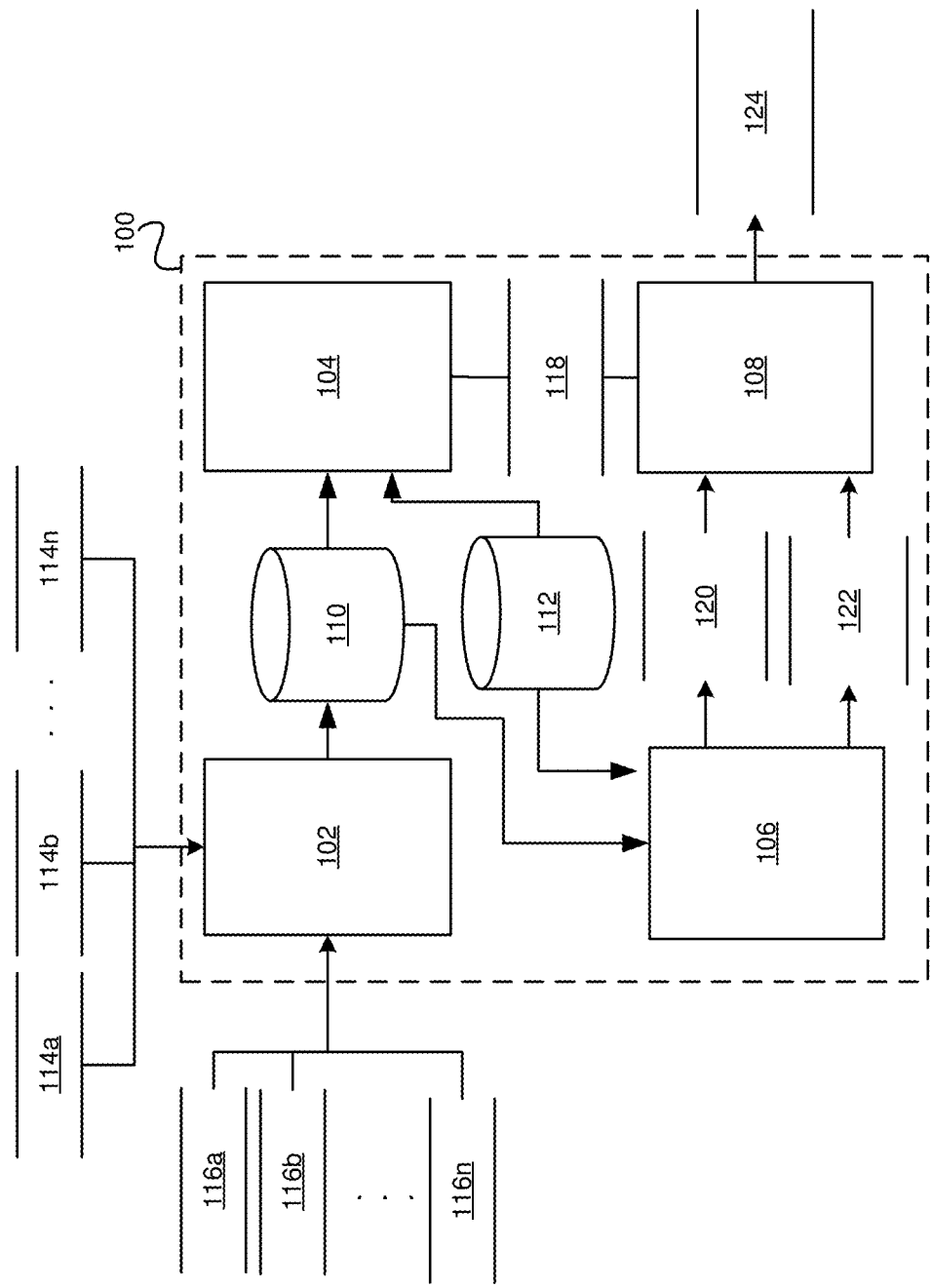
FIG. 3 is a dataflow diagram illustrating an interpretation system, in accordance with various embodiments.

As shown in more detail with regard to FIG. 3 and with continued reference to FIGS. 1 and 2, the interpretation system 100 includes a collection module 102, a visual-domain traffic light state monitoring module 104, a kinematic-domain traffic light state monitoring module 106, an assignment module 108, a collection datastore 110, and a model datastore 112.

The collection module 102 receives as input visual data 114a-114n sensed from any number of vehicles 10. For example, each vehicle 10 collects visual data from their vehicle cameras when passing through an intersection. In various embodiments, each vehicle 10 performs local traffic light detection and recognition methods on the camera data and uses an inherent tracking/temporal correlation relationship to improve the accuracy, by eliminating occasional occlusion, error detection or missing detections. Each vehicle 10 then communicates the pre-processed visual data 114a-114n to the interpretation system 100 (e.g., hosted on a cloud server not shown). The collection module 102 stores the collected visual data 114a-114n in the collection datastore 110 of a data storage device for further processing The collection module 102 further receives as input vehicle data 116a-116n from any number of vehicles 10. In various embodiments, the vehicle data 116a-116n includes, but not limited to, GPS location and time, speed, break status, yaw rate, lane assignment, etc. For example, each vehicle 10 collects vehicle data communicated on the CAN bus or other communication medium when the vehicle 10 passes through an intersection. The collection module 102 stores the collected vehicle data 116a-116n in the collection datastore 110 of a data storage device for further processing.

Figure 4:
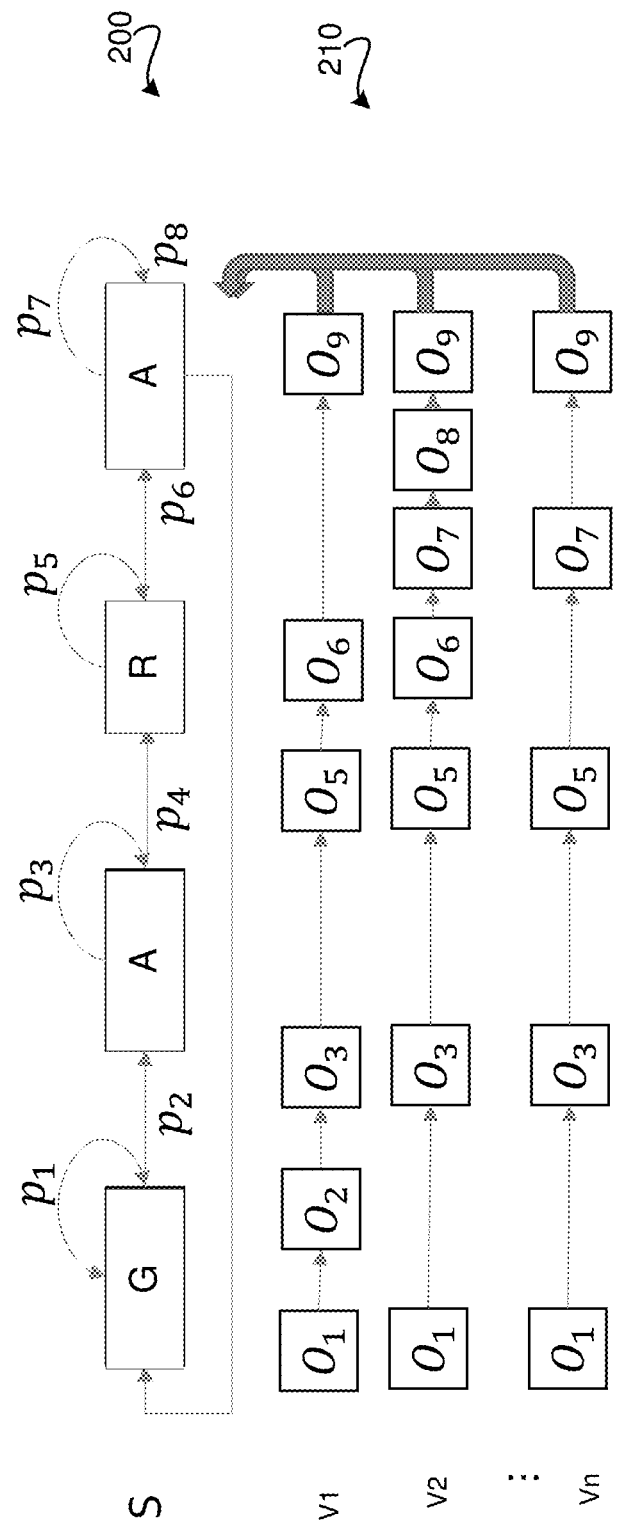
FIG. 4 is an illustration of a model used by the interpretation system, in accordance with various embodiments.

The visual-domain traffic state monitoring module 104 retrieves the collected visual data from the collection datastore 110 for processing. The visual-domain traffic state monitoring module 104 processes the collected data using a joint Hidden Markov model (HMM), stored for example, in the model datastore 112 of a data storage device to determine the state of a traffic light per time t, referred to as visual light state data 118. For example as shown in FIG. 4, the joint HMM leverages spatial correlations of observations 210 ($O_1, O_2, O_3 \ldots$) from vehicles (vehicle 1, vehicle 2, ...) and state transitions (p1, p2, ...) between states (G, A, R) 200 to filter out any errors in detection or missing detections by the individual vehicles 10. In various embodiments, the joint HMM uses iterative expectation maximization methods where:

$$E\text{-step: } P(O|u,\vartheta) = \Sigma_S \Sigma_{I(u;u)} P(O^u|S^u,I^u,u;\vartheta) P(I^u,S^u|u;\vartheta).$$

$$M\text{-Step: } Q(\vartheta,\vartheta') = \Sigma_S \Sigma_{I(u;u)} \Sigma_u P(S^u,I^u|O^u,u;\vartheta') \log P(I^u, O^u, S^u|u;\vartheta).$$

With reference back to FIG. 3, the kinematic-domain traffic light state monitoring module 104 retrieves the collected vehicle data from the collection datastore 110 for processing. The kinematic-domain traffic light state monitoring module 104 processes the collected vehicle data with a machine learning model, stored for example in the model datastore 112 to determine the state of a traffic light per time t, referred to as kinematic light state data 120. For example, the kinematic-domain traffic light state monitoring module 104 associates the collected vehicle data with a behavioral state. For example, behavioral states can be defined as, but not limited to, an accelerating state, a stopping state, a stopped state, and a cruising state. As can be appreciated, any number of behavioral states can be predefined. The kinematic-domain traffic light state monitoring module 104 evaluates the vehicle data and associates the vehicle data with one of the defined behavioral state. For example as shown in FIG. 4, Vehicle 1 shown in the top graph illustrating speed and time cruises at a certain speed until it see the light changing from green to red; it slows and stops for the red light. Vehicle 2 shown in the middle graph illustrating speed and time approaches the intersection, sees the red light, and stops. Vehicle 3 shown in the lower graph illustrating speed and time approaches the intersection, sees the green light, and passes through.

The kinematic-domain traffic light state monitoring module 104 then aggregates the data in each state for a given time frame using, for example, an aggregate state function where:

$$F_{STATE}(t) = \text{count}("S_i(t) == \text{STATE}, i \in \text{vehs}").$$

Figures 5, 6:
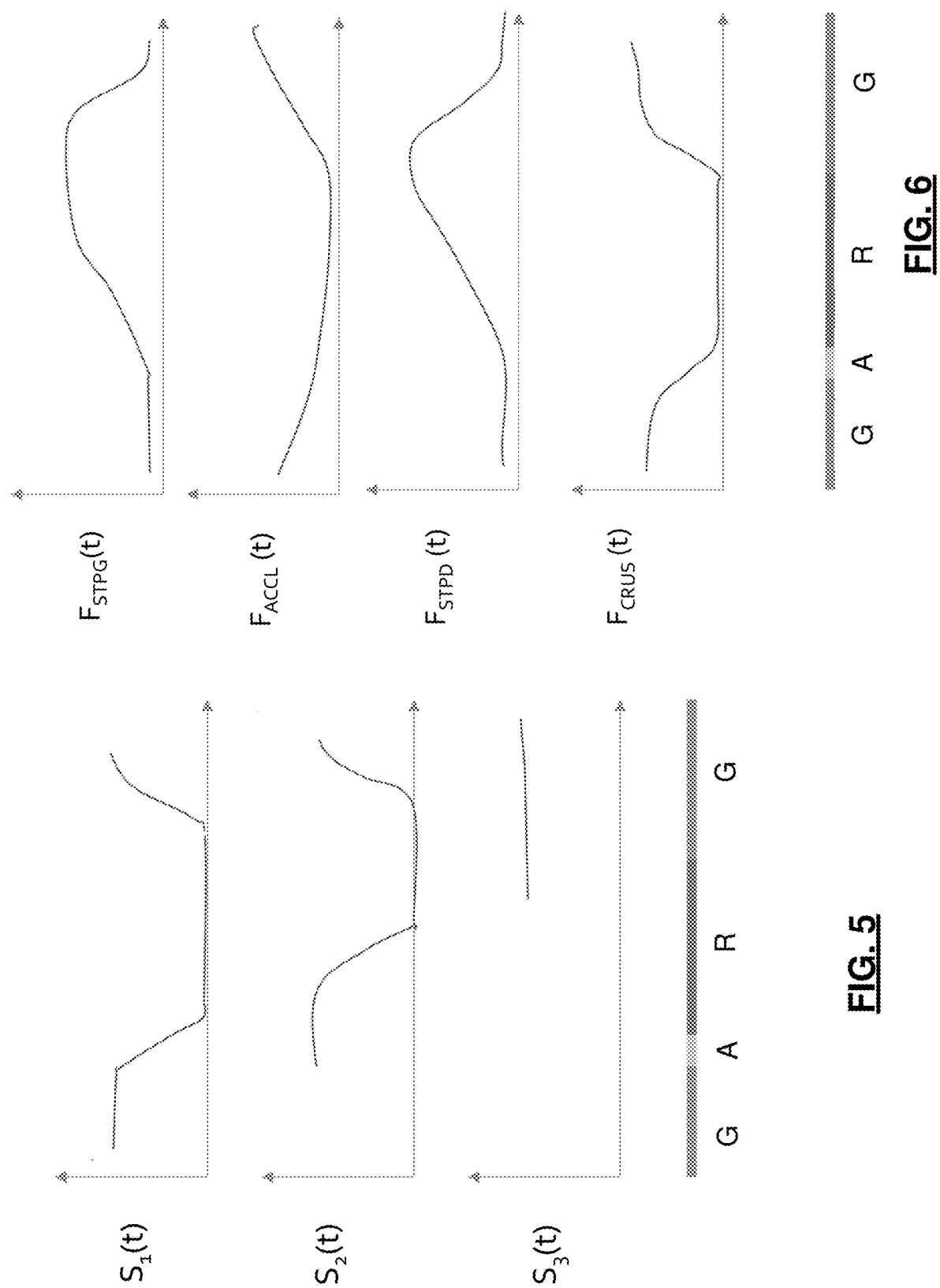
FIG. 5 includes multiple graphs illustrating different vehicle behavior states for a signal phase that are used by the interpretation system, in accordance with various embodiments.
FIG. 6 includes multiple graphs illustrating aggregate functions for each vehicle behavior that are used by the interpretation system, in accordance with various embodiments.

For example, as shown in FIG. 6, all vehicle states, from 10:00 am to 10:05 am, every day in the past one month are aggregated using the aggregate state function. The aggregate state function, and the derivative function at time t for each behavioral state are then processed by the machine learning (ML) model to determine the traffic signal state (e.g., red, green, amber) for a given timestamp. As can be appreciated, the ML model can be any trained machine learning model, such as, but not limited to a neural network, a support vector machine, etc.

The assignment module 106 receives the visual light state data 118, the kinematic light state data 120, and vehicle data 122 associated with the kinematic light state data 120. The assignment module 10 assigns a light to a lane based on a correlation between the visual light state data 118 and the kinematic light state data 120 and the associated vehicle data 122 and provides light to lane assignment data 124. For example, the assignment module 106 correlates the visual traffic light state data 118 and the kinematics light state data 120 based on a time correlation filter and determines changes in light states (e.g., red to green, green to amber, amber to red) based on the correlated data. The assignment module 106 determines velocities for each lane from the vehicle data 122 that is associated in time with the changes in light states (e.g., the time plus a delay). The assignment module 106 then assigns the light to a lane based on the changes in the traffic light states and a comparison of the lane velocity with a predefined velocity associated with a change in a light state.

Referring now to FIG. 6 and with continued reference to FIGS. 1-5, a method 500 for determining traffic light to lane assignment in various embodiments. As can be appreciated, in light of the disclosure, the order of operation within the method 500 is not limited to the sequential execution as illustrated in FIG. 5 but may be performed in one or more varying orders as applicable and in accordance with the present disclosure. In various embodiments, one or more steps of the methods 500 may be removed or added without altering the spirit of the method 500.

In one example, the method may begin at 505. The pre-processed visual data 114a-114n is collected from multiple vehicles 10 at 510. Thereafter, or substantially simultaneously, the pre-processed vehicle data 116a-116n is collected from multiple vehicles 10 at 520. Thereafter, the collected visual data 114a-114n is processed using a joint HMM as discussed above at 530 to determine the traffic light state at various times and provide the visual light state data 118. The collected vehicle data 118a-118n is processed using the trained ML model at 540 to determine the traffic light state at various times and to provide the kinematics light state data 112. The visual traffic light state data 118 and the kinematics light state data 120 are then correlated based on time at 550. Changes in light states (e.g., red to green, green to yellow, yellow to red) are determined from the correlated light state data at 560. Lane velocities are determined from the vehicle data 122 that is associated in time with the changes in light states (e.g., vehicle velocities at the time plus a delay) at 570. The light is then assigned to a lane based on the changes in the traffic light states and the lane velocities associated in time with the changes in light states at 580. The light to lane assignment data 124 is then communicated, for example, to the vehicles 10, for use in vehicle controls at 590. Thereafter, the method may end at 600.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for interpreting traffic information, comprising:
   receiving, by a processor, visual data from a plurality of vehicles, wherein the visual data is associated with an intersection of a roadway having one or more lanes;
   receiving, by the processor, vehicle data from the plurality of vehicles, wherein the vehicle data includes kinematics data of the plurality of vehicles associated with the intersection of the roadway;
   determining, by the processor, a first state of a traffic light associated with the intersection based on the visual data;
   determining, by the processor, a second state of the traffic light associated with the intersection based on the vehicle data;
   correlating, by the processor, the first state and the second state based on a time synchronization;
   assigning, by the processor, the traffic light to a lane of the roadway based on the correlating; and
   communicating, by the processor, the traffic light to lane assignment for use in controlling a vehicle of the plurality of vehicles.

2. The method of claim 1, further comprising:
   determining, by the processor, a change in state of the traffic light based on the correlated first state and second state;
   determining, by the processor, a vehicle velocity associated with the lane based on the vehicle data; and
   wherein the correlating is based on the change in state of the traffic light and the vehicle velocity.

3. The method of claim 1, wherein the determining the first state is based on a joint Hidden Markov Model.

4. The method of claim 3, wherein the joint HMM includes an iterative expectation maximization method.

5. The method of claim 1, wherein the determining the second state is based on a trained machine learning model.

6. The method of claim 5, further comprising:
   associating, by the processor, a behavioral state with each of the vehicle data from the plurality of vehicles;
   aggregating, by the processor, the vehicle data from the plurality of vehicles based on the associated behavioral state and a time associated with the vehicle data; and
   processing the aggregated vehicle data with the trained machine learning model.

7. The method of claim 6, wherein the behavioral state is at least one of an accelerating state, a stopping state, a stopped state, and a cruising state.

8. The method of claim 6, wherein the aggregating is based on an aggregated state function and an inverse of the aggregated state function.

9. The method of claim 1, wherein the first state is at least one of a green state, an amber state, and a red state, and wherein the second state is at least one of the green state, the amber state, and the red state.

10. A system for interpreting traffic information, comprising:
- a first data storage device that stores visual data from a plurality of vehicles, wherein the visual data is associated with an intersection of a roadway having one or more lanes;
- a second data storage device that stores vehicle data from the plurality of vehicles, wherein the vehicle data includes kinematics data of the plurality of vehicles associated with the intersection of the roadway; and
- a processor configured to:
  receive the visual data and the vehicle data,
  determine a first state of a traffic light associated with the intersection based on the visual data,
  determine a second state of the traffic light associated with the intersection based on the vehicle data,
  correlate the first state and the second state based on a time synchronization,
  assign the traffic light to a lane of the roadway based on the correlating.

11. The system of claim 10, wherein the processor is further configured to:
- determine a change in state of the traffic light based on the correlated first state and second state;
- determine a vehicle velocity associated with the lane based on the vehicle data; and
- wherein correlate based on the change in state of the traffic light and the vehicle velocity.

12. The system of claim 10, wherein the processor is configured to determine the first state based on a joint Hidden Markov Model.

13. The system of claim 12, wherein the joint HMM includes an iterative expectation maximization method.

14. The system of claim 10, wherein the processor is configured to determine the second state based on a trained machine learning model.

15. The system of claim 10, wherein the processor is further configured to:
- associate a behavioral state with each of the vehicle data from the plurality of vehicles;
- aggregate the vehicle data from the plurality of vehicles based on the associated behavioral state and a time associated with the vehicle data; and
- process the aggregated vehicle data with a trained machine learning model.

16. The system of claim 15, wherein the behavioral state is at least one of an accelerating state, a stopping state, a stopped state, and a cruising state.

17. The system of claim 15, wherein the processor aggregates based on an aggregated state function and an inverse of the aggregated state function.

18. The system of claim 10, wherein the first state is at least one of a green state, an amber state, and a red state, and wherein the second state is at least one of the green state, the amber state, and the red state.

19. The system of claim 10, further comprising a cloud server remote from the plurality of vehicles that includes the first data storage device, the second data storage device, and the processor.

20. The system of claim 19, where the cloud server is configured to communicate the traffic light to lane assignment to the plurality of vehicles for use in controlling the plurality of vehicles.

* * * * *